(12) United States Patent
Jiang

(10) Patent No.: US 9,686,671 B2
(45) Date of Patent: Jun. 20, 2017

(54) CAMEL ROAMING ADAPTATIONS

(75) Inventor: John Y. J. Jiang, Danville, CA (US)

(73) Assignee: MOBILEUM, INC., Santa Clara, CA (US)

( * ) Notice: Subject to any disclaimer, the term of this patent is extended or adjusted under 35 U.S.C. 154(b) by 47 days.

(21) Appl. No.: 12/968,184

(22) Filed: Dec. 14, 2010

(65) Prior Publication Data

US 2011/0124331 A1    May 26, 2011

Related U.S. Application Data

(63) Continuation-in-part of application No. 12/523,828, filed as application No. PCT/US2008/000765 on Jan. 22, 2008.

(60) Provisional application No. 61/286,130, filed on Dec. 14, 2009, provisional application No. 60/881,136, filed on Jan. 19, 2007.

(51) Int. Cl.
*H04W 4/00* (2009.01)
*H04W 8/12* (2009.01)

(52) U.S. Cl.
CPC .................................. *H04W 8/12* (2013.01)

(58) Field of Classification Search
CPC ......... H04W 8/08; H04W 8/082; H04W 8/02; H04W 88/00; H04W 8/12

USPC ........... 455/431.1–432.3, 433, 435.1–435.2, 455/422.1; 370/328, 331, 338
See application file for complete search history.

(56) References Cited

U.S. PATENT DOCUMENTS

| | | | |
|---|---|---|---|
| 2003/0014367 A1* | 1/2003 | Tubinis | G06Q 20/12 705/64 |
| 2003/0095566 A1* | 5/2003 | Bunting | H04Q 3/0029 370/465 |
| 2006/0291418 A1* | 12/2006 | Singh | 370/331 |
| 2007/0197213 A1* | 8/2007 | Weintraub | H04M 3/545 455/433 |
| 2007/0217354 A1* | 9/2007 | Buckley | 370/328 |
| 2010/0020744 A1* | 1/2010 | Muratore et al. | 370/328 |

* cited by examiner

*Primary Examiner* — Wayne Cai
(74) *Attorney, Agent, or Firm* — Arent Fox LLP

(57) ABSTRACT

The present invention is directed towards a method for facilitating roaming tests for a club network. The method includes simulating a roamer's profile by a signaling gateway and associating with either a club network or a roaming partner network of the club network. The club network and the roaming partner network correspond to a Home Public Mobile Network (HPMN) and a Visited PMN, respectively, in case the roamer is an outbound roamer. In case the roamer is an inbound roamer, the club network corresponds to the VPMN and roaming partner network corresponds to the HPMN. The method further includes performing by the signaling gateway, one or more CAMEL capability tests on the roamer. The roaming subscriber is associated with either the club network or the roaming partner network.

19 Claims, 15 Drawing Sheets

CAMEL ROAMING ADAPTATIONS

RELATED APPLICATIONS

This application claims the benefit of U.S. Provisional Application No. 61/286,130 entitled "CAMEL Hubbing, CAMEL Testing and Prepaid Roaming Hubbing" filed on Dec. 14, 2009. This application is also a continuation-in-part of U.S. patent application Ser. No. 12/523,828 entitled "Non-Standard Prepaid Outbound Roaming and Its Transparent Solutions to Charge MT Call Routing to Outbound Roamers and to Charge MO-SMS from Outbound Roamers" filed on Jul. 20, 2009, which is a national stage entry of PCT/US08/00765 entitled "METHOD AND SYSTEM FOR PROVIDING ROAMING SERVICES TO PREPAID ROAMERS OF A HOME NETWORK" filed on Jan. 22, 2008, which in turn claims the benefit of U.S. Provisional Application No. 60/881,136 entitled "Non-Standard Prepaid Outbound Roaming and Its Transparent Solutions to Charge MT Call Routing to Outbound Roamers and to Charge MO-SMS From Outbound Roamers" filed on Jan. 19, 2007. Each of the preceding applications is incorporated by reference in its entirety herein.

FIELD OF THE INVENTION

The present invention generally relates to mobile communication. More specifically, the invention relates to enabling mobile communication for CAMEL roamers.

BACKGROUND OF THE INVENTION

Roaming traffic contributes a significant percentage of an operator's revenue and even a better percentage of the operator's margin. With increasing competition and regulatory control, operators are being more pressured to increase their roaming revenue and reduce roaming margin losses. They need keep a check on roaming quality and fraud control at both, own networks to serve inbound roamers and roaming partner networks to serve outbound roamers, that can directly impact an operator's roaming revenue and margin.

CAMEL is an Intelligent Network (IN) based standard that has a framework to help a network operator to provide the subscribers with the operator specific services even when roaming outside the home network. The primary use of CAMEL is prepaid (outbound) roaming. Unlike a USSD based prepaid roaming solution which is call-back based, CAMEL based prepaid roaming provides a seamless user experience just like normal mobile originated activities (calls, SMS etc). Since signaling control of an outbound roamer's call is passed by the VPMN gsmSSF to the HPMN gsmSCF, the gsmSCF is able to deduce the prepaid roamer's balance appropriately.

Camel roaming is primarily used for prepaid outbound roaming. Camel roaming is also becoming more valuable for many advanced value services such as short code, fraud control, misdialed call correction, real-time billing, CLI delivery, home call routing etc for outbound roamers. Unlike a USSD based prepaid roaming solution which is call-back based, CAMEL based prepaid roaming provides a seamless user experience just like normal mobile originated activities (calls, SMS etc). Since signaling control of an outbound roamer's call is passed by the VPMN gsmSSF to the HPMN gsmSCF, the gsmSCF can properly deduce the prepaid roamer's balance.

Another use of CAMEL is to enable Virtual Home Environment (VHE). Some implementation of VHE services can be like outbound roamers' calls based on home dialing experience (e.g. calls without country codes or home international access prefix, short code calls etc) can be correctly translated to the ones corresponding to the visitor network environment to complete the calls to provide a home-like user experience.

CAMEL is also useful for real-time billing. TAP records between roaming partners can come in as late as a month. Since it is just a wholesale Inter Operator Tariff (IOT) from the TAP exchange that doesn't affect retail IOT, the HPMN can produce retail billing in real-time. CAMEL can be used as well to implement fraud control measures. Operator Determined Barring (ODB) works well on all calls or international call barring while roaming at a VPMN but not well on premium numbers barring at the VPMN since these numbers can change dynamically. By using CAMEL control on an outbound roamer, all the roamer's calls can be restricted according to HPMN application logic.

Other services like selective home routing, least cost routing or CLI delivery or third party partner carrier routing from an outbound roamer can also be implemented using the CAMEL capabilities. In this case, an outbound roamer's call can be selectively routed back to the home network or a partner network based on the called number and the calling network. The selection logic employed by the HPMN gsmSCF can be based on least cost routing or just quality service control (e.g. roaming quality monitoring or for better delivery of caller ID via home or partner network) or lawful interception at home or just simply collect termination charges at home without incurring extra charges to the roamer.

Although there are many camel relationships around, there are still many relationships that are non-established. This is primarily attributed to the high cost of resources involved in conducting Camel roaming tests. Also, another reason is that there is a significant mismatch of CAMEL phases and various non-standard CAMEL related implementations by different operators, thus making the agreements difficult to carry out. For example, some VPMN may have only Camel phase 1 support for inbound camel roaming, while HPMN's prepaid roaming supports Camel phase 2 only. Some HPMNs only supports Camel Phase 1 for outbound roaming, while the VPMN may only support Camel 2 for inbound roaming. This creates major mismatches between CAMEL phases of different operators.

In accordance with the foregoing, there is a need in the art of a system, a method, and a computer product for facilitating roaming of inbound and outbound roamers of an operator, by providing various CAMEL adaptations between the networks. The solution may be deployed for one single operator or in a central manner for multiple operators. When solution is used for multiple operators, the deployment can be hub based, where each of these operators can be considered as a club member.

SUMMARY

The present invention is directed towards a method for facilitating roaming of subscribers associated with a club network. The method includes interfacing by the gateway, one or more messages associated with the subscriber. The messages are exchanged between the club network and a roaming partner network. The club network and the roaming partner network correspond to a Home Public Mobile Network (HPMN) and a Visited PMN, respectively, in case the roamer is an outbound roamer. In case the roamer is an inbound roamer, the club network corresponds to the VPMN and roaming partner network corresponds to the HPMN. The method further includes performing by the gateway, one or more adaptations between the club network and the roaming partner network to enable roaming for the subscriber.

Another aspect of the present invention is directed towards a system for facilitating roaming of subscribers associated with a club network. The system includes a gateway that interfaces one or more messages associated with the subscriber. The messages are exchanged between the club network and a roaming partner network. The club network and the roaming partner network corresponds HPMN and VPMN, respectively, in case the roamer is an outbound roamer. In case the roamer is an inbound roamer, the club network corresponds to the VPMN and roaming partner network corresponds to the HPMN. The gateway further performs one or more adaptations between the club network and the roaming partner network to enable roaming for the subscriber.

Yet another aspect of the present invention is directed towards a computer program product comprising a computer usable program code for facilitating roaming of subscribers associated with a club network. The computer usable program code interfaces one or more messages associated with the subscriber. The messages are exchanged between the club network and a roaming partner network. The club network and the roaming partner network correspond to an HPMN and a VPMN, respectively, in case the roamer is an outbound roamer. In case the roamer is an inbound roamer, the club network corresponds to the VPMN and roaming partner network corresponds to the HPMN. The computer usable program code further performs one or more adaptations between the club network and the roaming partner network to enable roaming for the subscriber.

BRIEF DESCRIPTION OF DRAWINGS

In the drawings, the same or similar reference numbers identify similar elements or acts.

DETAILED DESCRIPTION

Figure 1:
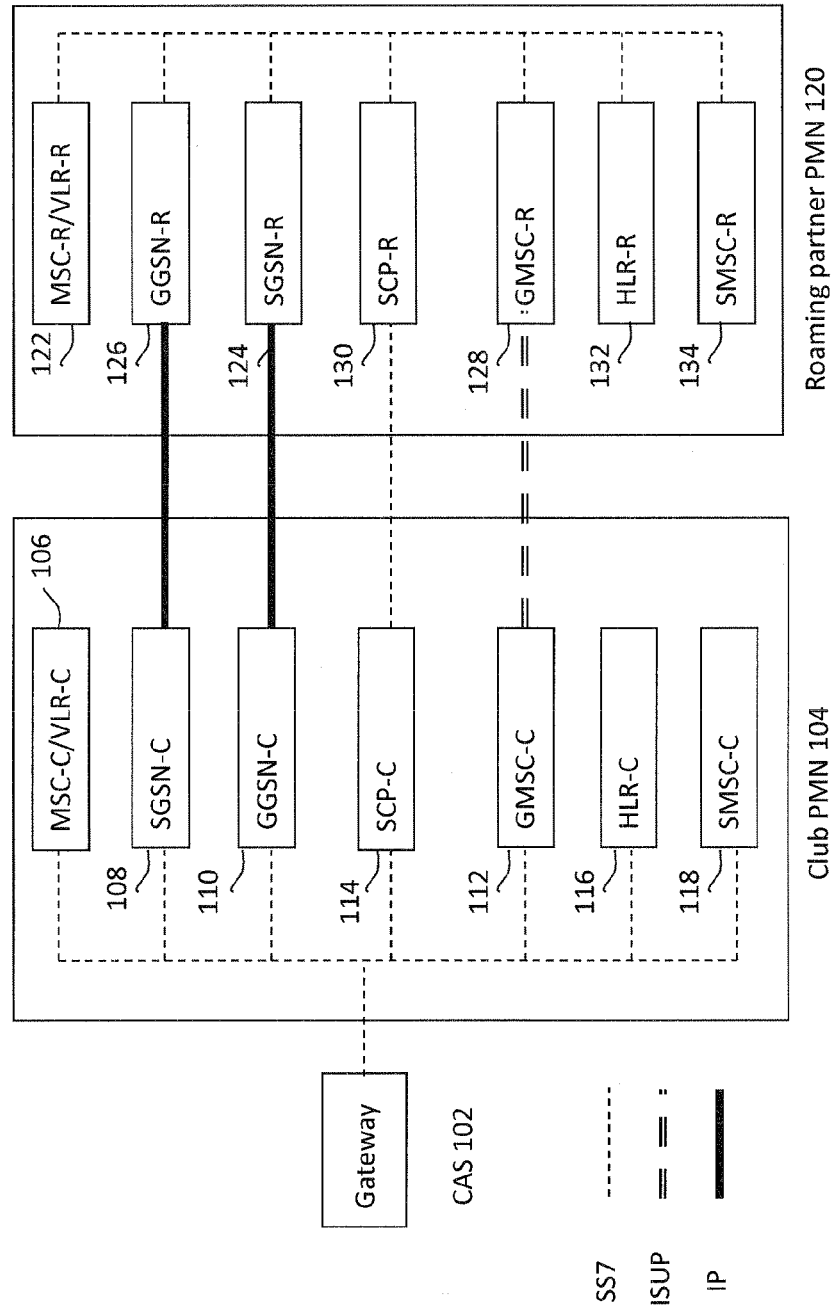
FIG. 1 illustrates a system for facilitating roaming for inbound and outbound roamers of a club Public Mobile Network (PMN), in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product for facilitating roaming for both outbound and inbound roamers of an operator when one or more CAMEL adaptations are required between the operator and the roaming partner networks. The present invention involves deploying a CAMEL Adaptation System (CAS) for either a single operator or a group of operators for both their outbound and inbound roamers. The CAS can be deployed at any location so as long it is able to reach these operators using SS7-based signaling. Hence, the CAS is presented at a hub location serving the operator as a member of a club, so the operator is hereinafter referred to as a club operator. When the club member requires adaptations for its outbound roamer at a roaming partner network, the club member is considered to be an HPMN and the roaming partner network as a VPMN. Likewise, when the club member requires adaptations for an inbound roamer from a roaming partner, the club member is considered to be the VPMN and the roaming partner network is the HPMN.

In accordance with various embodiments of the present invention, the functions of CAS are performed by a gateway associated with the club network and the roaming partner network, in the same manner as CAS is connected. Hence, the term gateway and CAS are hereinafter interchangeably used.

The club network operator performs these CAMEL adaptations by deploying the gateway, i.e., the CAS, either in the club network or outside the club network (at a centralized location, in a hub architecture) having a signaling connection to reach the club network for serving different club networks. In this manner, the signaling gateway is able to serve either one club network or multiple club networks (in multi-tenant support) for the CAMEL adaptations. Each of these different networks for which these tests can be conducted become a part of the club, and are hereinafter interchangeably referred to as club members. Each of these club members may appear as HPMN or VPMN to their respective roaming partners depending on whether the tests are done for outbound roamers or inbound roamers of the club network.

A roaming partner network corresponds to a network that has at least one roaming agreement such as, but not limited to, Global System for Mobile communication (GSM), General Packet Radio Services (GPRS), Customized Application for Mobile Enhanced Logic (CAMEL) and Third Generation of mobile (3G) agreement with the club network. It will be apparent to a person skilled in the art that roaming services include standard call and non-call related activities such as, but not limited to, Mobile Originated (MO) call, Mobile Terminated (MT) call, Short Message Service (SMS), Packet Data Network (PDN), and other Value Added Services (VASs) such as call forwarding, call barring etc.

One or more embodiments of the present invention address the following types of CAMEL adaptations:

SCP Adaptations
  Camel protocol may be standard with many operators but prepaid charging is not standard with many operations. Hence, some SCPs bill based on location number and others bill based on the location information of the roamers. Modifying SCP is cumbersome, time consuming and even costly in cases where many SCP vendors are involved. This present invention in its various embodiments proposes an SCP adaptation approach to avoid these changes in the SCP.

Location Adaptations
  Multiple countries do not enable roaming for certain class of subscribers. Moreover, to enable CAMEL prepaid roaming, normal roaming is first required to be enabled. However, changing non-roaming profile to roaming is time consuming and cumbersome. The present invention in its various embodiments proposes a location adaptation approach to avoid such a change.

CAMEL Phase Adaptations
  CAMEL is generally backward compatible in the sense that operators with higher version of CAMEL (say Phase 3) can support subscribers with CAMEL phase 2 requirements too. However, various operators only have support or license for one CAMEL phase as multiple phase subscription is costly and time consuming. Thus, the present invention in its various embodiments proposes one or more CAMEL cross phase adaptations solutions to alleviate these problems.

CAMEL Billing Adaptations
  Some HPMNs or VPMNs may not have the capability to produce or handle certain CAMEL fields in TAP/CDRs for wholesale or retail billing. In such cases the present invention in its various embodiments, proposes various CAMEL billing adaptations.

CAMEL and Non-CAMEL Adaptations
  In some cases, operators do not have CAMEL support, but yet want to serve inbound and outbound CAMEL roamers. To help such operators, the present invention in its various embodiments, performs various CAMEL and non-CAMEL adaptations.

FIG. 1 illustrates a system 100 that facilitates roaming services for both inbound and outbound roamers of the club PMN network, in accordance with an embodiment of the present invention. System 100 includes a CAMEL Automated System (CAS) 102 (i.e., the gateway) in a club Public Mobile Network (PMN) 104 (i.e., the club network). Club PMN 104 operator uses CAS 102 to interface (i.e., intercept) one or more messages associated with the roamer (i.e., outbound roamers that may roam in any of the roaming partner networks, and the inbound roamers that may be coming from any of these roaming partner networks). Further the CAS 102 performs one or more adaptations to enable the roaming for the roamer. CAS 102 further includes a database (not shown in FIG. 1) that contains information that enables the CAS 102 to perform one or more adaptations. CAS 102 is connected with the database through various signaling techniques. Thus, club PMN 104 acts as a Home PMN (HPMN) of the outbound roamers, whereas roaming partner networks in which these outbound roamers may roam act as Visited PMNs (VPMNs). Accordingly, club PMN 104 acts as a VPMN for the inbound roamers, whereas roaming partner networks to which these inbound roamers belong, act as HPMNs.

Club PMN 104 further includes a Mobile Switching Center (MSC)/Visiting Location Register (VLR) 106, a Serving GPRS Support Node (SGSN) 108, a Gateway GPRS Support Node (GGSN) 110, a Gateway MSC (GMSC) 112, a roaming Signal Control Point (SCP) 114, a Home Location Register (HLR) 116 and a Short Message Service Center (SMSC) 118. Since network elements MSC/VLR 106, SGSN 108, GGSN 110, GMSC 112, SCP 114, HLR 116 and SMSC 118 reside in Club PMN 104, they are hereinafter referred to as MSC-C/VLR-C 106, SGSN-C 108, GGSN-C 110, GMSC-C 112, SCP-C 114, HLR-C 116 and SMSC-C 118, respectively. These network elements communicate with each other over a Signaling System 7 (SS7) link (represented by dashed lines in FIG. 1), except that SGSN-C 108 communicates with GGSN-C 110 via an Internet Protocol (IP) link (represented by solid lines in FIG. 1).

System 100 further includes a roaming partner PMN 120 (i.e., the roaming partner network) that is associated with club PMN 104. It will be apparent to a person skilled in the art that system 100 may include various other roaming partner networks. However, for the sake of convenience, this embodiment considers only one roaming partner network (i.e., roaming partner PMN 120). Roaming partner PMN 120 includes a MSC/VLR 122, a SGSN 124, a GGSN 126, a GMSC 128, an SCP 130, an HLR 132 and an SMSC 134. Since network elements MSC/VLR 122, SGSN 124, GGSN 126, GMSC 128, SCP 130, HLR 132 and SMSC 134 reside in roaming partner PMN 120, they are hereinafter referred to as MSC-R/VLR-R 122, SGSN-R 124, GGSN-R 126, GMSC-R 128, SCP-R 130, HLR-R 132 and SMSC-R 134, respectively. All these network elements of roaming partner PMN 120 communicate with each other over the SS7 link, except that SGSN-R 124 communicates with GGSN-R 126 via the IP link. Further, as shown in FIG. 1, the network elements of roaming partner PMN 120 also communicate with the network elements of club PMN 104. For example, GMSC-R 128 communicates with GMSC-C 112 over an ISDN User Part Protocol (ISUP) link, whereas SGSN-R 124 and GGSN-R 126 communicate with GGSN-C 110 and SGSN-C 108, respectively via the IP link.

Other network elements of roaming partner PMN 120 (e.g., MSC-R/VLR-R 122) communicate with various other network elements of club PMN 104 (e.g., HLR-C 116) via the SS7 link. It will also be apparent to a person skilled in the art that various components of club PMN 104 communicate with roaming partner PMN 120 using various signaling techniques including, but not limited to, SS7, SIP, IP, ISUP etc.

It will also be apparent to a person skilled in the art that club PMN 104 and roaming partner PMN 120 may also include various other network components (not shown in FIG. 1), depending on the architecture under consideration. In an embodiment of the present invention, various network elements of club PMN 104 and roaming partner PMN 120 are located in an IR.21 database (not shown in FIG. 1) such as RAEX IR.21. In an embodiment of the present invention, the IR.21 database is coupled to CAS 102.

The most important CAMEL architecture network elements consist of a GSM Service Control Function (gsmSCF) in club PMN and a GSM Service Switch Function (gsmSSF) in roaming partner PMN. The gsmSCF and gsmSSF communicates with each other using the CAMEL Application Part (CAP). When a CAMEL outbound roamer is registering at a CAMEL partner VPMN VLR, the HPMN HLR of the roamer provides CAMEL Subscription Information (CSI) to the VPMN VLR for the roamer via MAP Insert Subscriber Data (ISD) message.

In order to facilitate roaming services for the inbound and outbound roamers, CAS 102 interfaces the messages flowing between club PMN 104 and roaming partner PMN 120. CAS 102 taps SS7 and IP roaming links between network elements of club PMN 104 and roaming partner PMN 120 in order to monitor roaming signaling traffic and packet data traffic at club PMN 104. Thereafter, CAS 102 performs various CAMEL adaptations between club network 104 and roaming partner network 120, to enable roaming for the subscriber. The roaming signaling traffic includes both Signaling Connection Control Part (SCCP) and ISUP traffic.

In an embodiment of the present invention, the SCCP and ISUP traffic is transported over an IP interface such as, but not limited to, Signaling Transport (SIGTRAN) protocol, Voice over IP (VoIP) and Real-Time Transport Protocol (RTP). The SCCP traffic includes Mobile Application Part (MAP) traffic, CAMEL Application Part (CAP) traffic and Transaction Capabilities Application Part (TCAP) traffic. CAS 102 further taps the SS7 link between SCP-C 114 and SCP-R 130 and the ISUP link between GMSC-C 112 and GMSC-R 128, in accordance with another embodiment of the present invention. In one embodiment of the present invention, CAS 102 passively taps signaling path between the network elements of club PMN 104 and roaming partner PMN 120. In another embodiment of the present invention, CAS 102 intercepts the signaling path with an address such as a Global Title (GT), a point code or an IP address.

Furthermore, in an embodiment of the present invention, CAS 102 performs roaming signaling traffic and packet data traffic exchange between club PMN 104 and roaming partner PMN 120 for club PMN 104's outbound and inbound roamers. Additionally, in another embodiment of the present invention, CAS 102 is connected with the network elements of club PMN 104 internally (e.g., communicates with GMSC-C 112 via the ISUP link and communicates with MSC-C/VLR-C 106 via the SS7 link).

Figure 2:
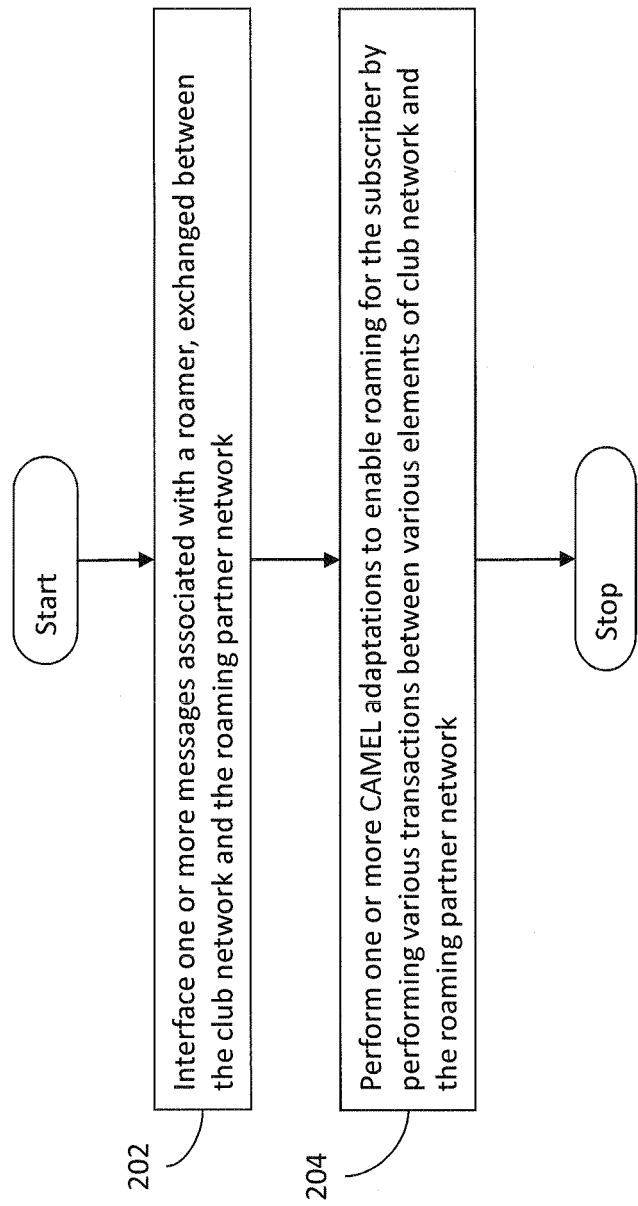
FIG. 2 represents a flowchart for facilitating roaming for the inbound and outbound roamers, in accordance with an embodiment of the present invention.

Now, in order to facilitate roaming for the subscribers of club PMN 104 operator, CAS 102 needs interfaces messages and perform various CAMEL adaptations for the subscriber. FIG. 2 represents a flowchart for facilitating roaming for simulated inbound and outbound roamers, in accordance with an embodiment of the present invention. At step 202, CAS 102 interfaces one or more messages associated with the roamer exchanged between club PMN 104 and roaming partner PMN 120. Thereafter at step 204, CAS 102 performs one or more CAMEL adaptations to enable roaming for the subscriber by performing various transactions between various elements of club PMN 104 and roaming partner PMN 120. These transactions include, but not limited to, TCAP traffic, packet data traffic and ISUP traffic. All the CAMEL adaptations are explained later in various embodiments of the present invention.

SCP Adaptation Procedure for Outbound and Inbound Roamers

Figure 3:
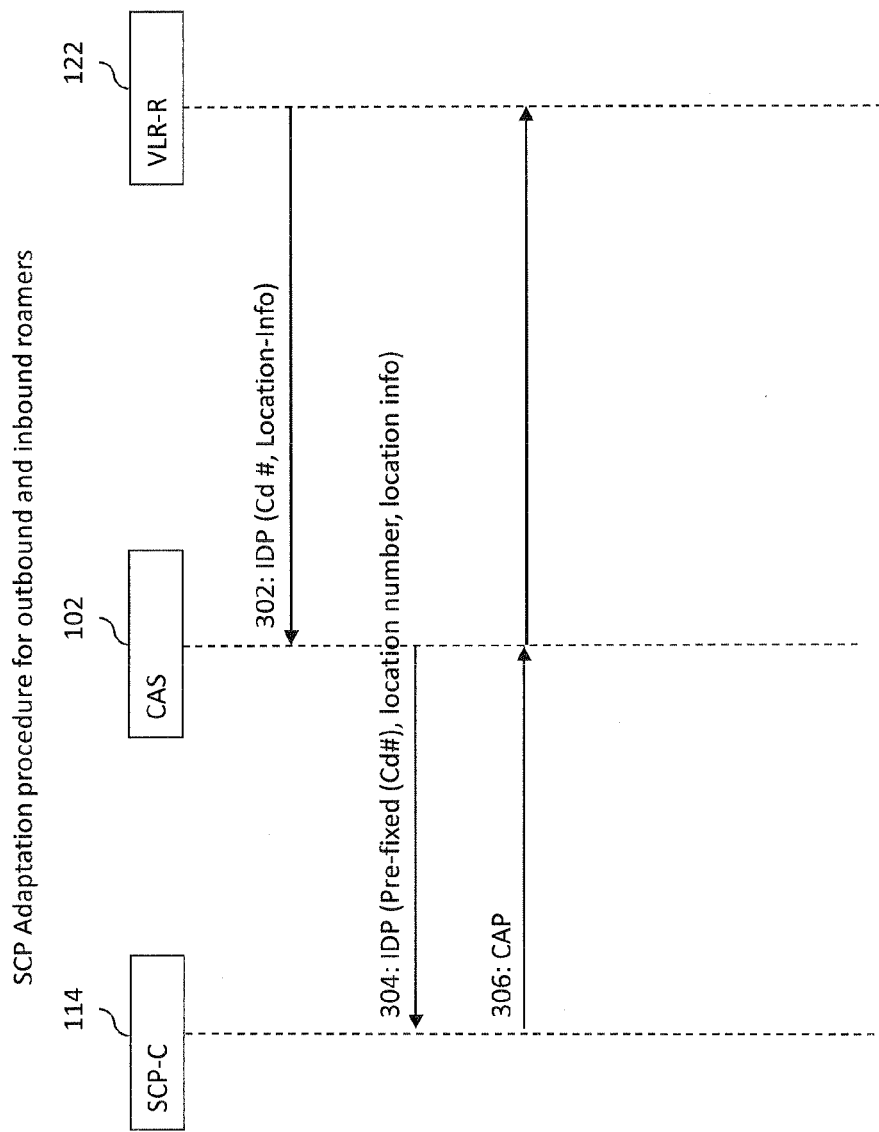
FIG. 3 represents a flow diagram for performing SCP adaptation for the inbound and outbound roamers of the club network, in accordance with an embodiment of the present invention.

FIG. 3 represents a flow diagram for performing SCP adaptations, using CAS 102, for the inbound and outbound roamers of club PMN 104, in accordance with an embodiment of the present invention. CAS 102 performs all these adaptations with involving SCP of club member (SCP-C 114), and all signaling between SCP-C 114 and roaming partner's VLR-R/VMSC-R 122 will be relayed through CAS 102.

It will be apparent to a person skilled in the art that while CAP protocol is a standard, there is no standard for the parameters that should be used by SCP for billing in CAP (e.g. IDP) messages. For example, in countries like China, there are various SCP which are built to only cater to domestic roaming. Hence, these SCPs use either a prefix to the called number or the location number in Camel IDP to determine charging. These prefixes and location numbers are added by originating MSCs or GMSCs, which do not hold any relevance in international roaming scenario.

In accordance with an embodiment of the present invention, CAS 102 uses the database to maintain a list of mapping for each SCP that uses prefix or location number to do location based charging.

The prefix based mapping could be stored in the database in the form of:

(HPMN SCP, VPMN VMSC)=>prefix

The location number based mapping could be stored in the database in the form of:

(HPMN SCP, VPMN VMSC)=>location=>number

In both of these mappings, each field can just have a wildcard * or a prefix. For example, VPMN VMSC can be a country code only.

Hence, in FIG. 3, at step 302, when CAP IDP message with Called number and location information is relayed thru CAS 102, CAS 102 runs SCP-C 114 and VMSC-R 122 through the above mentioned two lists of mappings. Now, if a prefix mapping is found, CAS 102 adds the Called Number with the prefix and then relays the modified IDP message to SCP-C 114, at step 304. Similarly, if a location-number mapping is found, CAS 102 adds the location number field with the location number and then relays the modified IDP message to SCP-C 114, at step 304. Otherwise, IDP parameters are unchanged when relayed to SCP-C 114. Thereafter, at step 306, SCP-114 sends a CAP message to VMC-R 122 that is relayed through CAS 102.

It will be apparent to a person skilled in the art that though the above procedure is shown for the outbound roamers of club network 104, the similar procedure (call flow) can be applied for the inbound roamers visiting club network 104, in which case, club network 104 will acts as VPMN, while roaming partner network 120 will act as HPMN.

Location Adaptation Procedure for Outbound and Inbound Roamers

Figure 4:
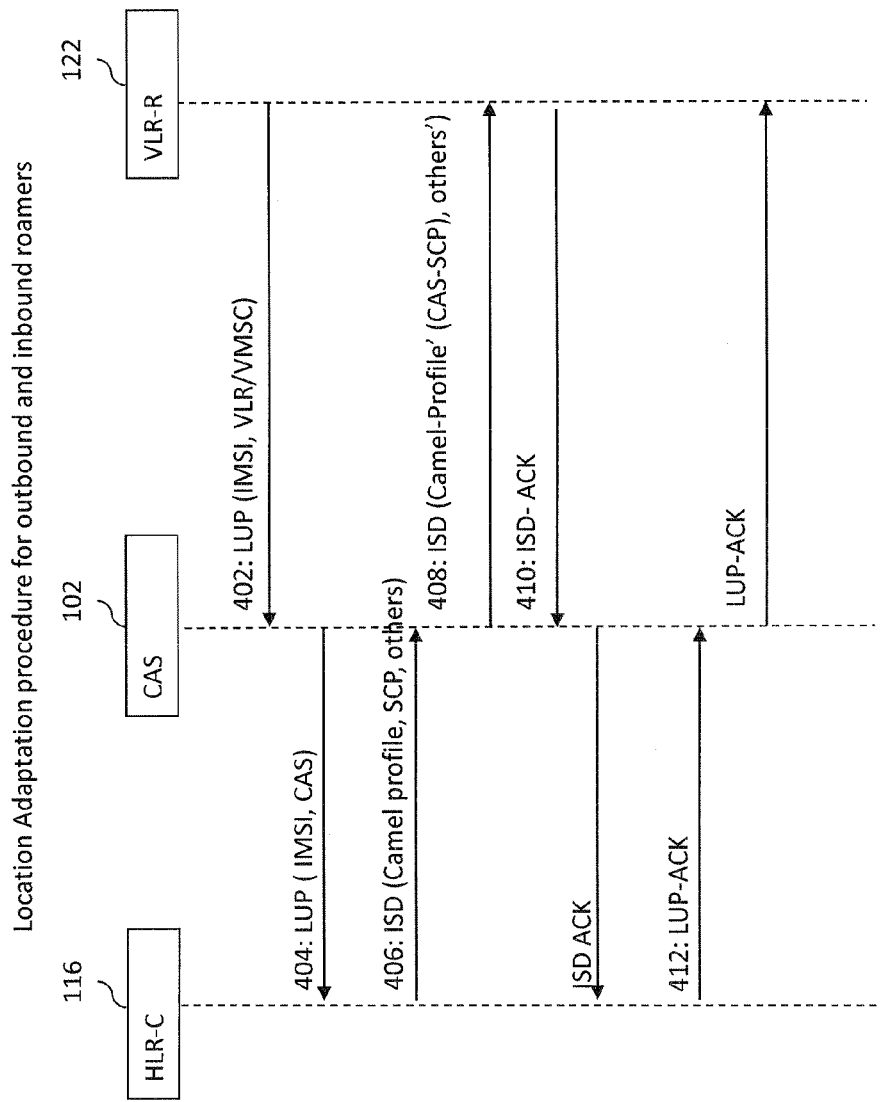
FIG. 4 represents a flow diagram for performing location update adaptation for the inbound and the outbound roamers of the club network, in accordance with an embodiment of the present invention.

In various countries like China, Africa and Middle East, prepaid roaming is not active by default for the roamers. In accordance with an embodiment of the present invention, CAS 102 performs location adaptation procedure where it modifies the location update coming from the roaming partner network to reflect as if the roaming is still with home network, i.e. club network 104. FIG. 4 represents a flow diagram for performing location update adaptation for the inbound and the outbound roamers of club network 104, in accordance with an embodiment of the present invention. At step 402, when CAS 102 receives the Location update from VLR-R 122, it changes the address with its own address and relays the modified LUP to HLR-C 116 at step 404. Thereafter, at step 406, HLR-C 116 returns the ISD message with CAMEL profile and other information to CAS 102, which then relays this ISD to VLR-R 122, at step 408. Finally, the location update is successful with exchange of ISD-ACK message and LUP ACK messages, at step 410 and 412 respectively.

It will be apparent to a person skilled in the art that though the above procedure is shown for the outbound roamers of club network 104, the similar procedure (call flow) can be applied for the inbound roamers visiting club network 104, in which case, club network 104 will acts as VPMN, while roaming partner network 120 will act as HPMN.

Camel Phase Adaptation Procedures for Outbound and Inbound Roamers

There are various types of CAMEL phase adaptations that are represented in various embodiments of the present invention.

a) CAMEL Phase Adaptation During Location Update

Usually, support for various CAMEL phases is part of agreement between roaming partners. However, CAMEL phase support could be different for inbound and outbound roamers. For example, let us say, Telefonica Spain supports phase 2 for inbound roamers, but phase 1 for outbound roamers. This may be due to the reason that SCP is built at phase 1.

In other examples, some VPMNs may not support phase 1 for inbound roamers, but only phase 2 or above, may be due to license issues. Likewise, some HPMNs may not support phase 1 for outbound roamers, but VPMN may support phase 1. Some HPMNs only support phase 3 for prepaid SMS, but VPMN support phase 2.

Hence, CAS 102 performs various phase adaptations between HPMN and VPMN so that they have matching phases. CAS 102 tunes down the CAMEL phase when moving to lower phase network, while original camel profile is stored at CAS 102.

Figure 5:
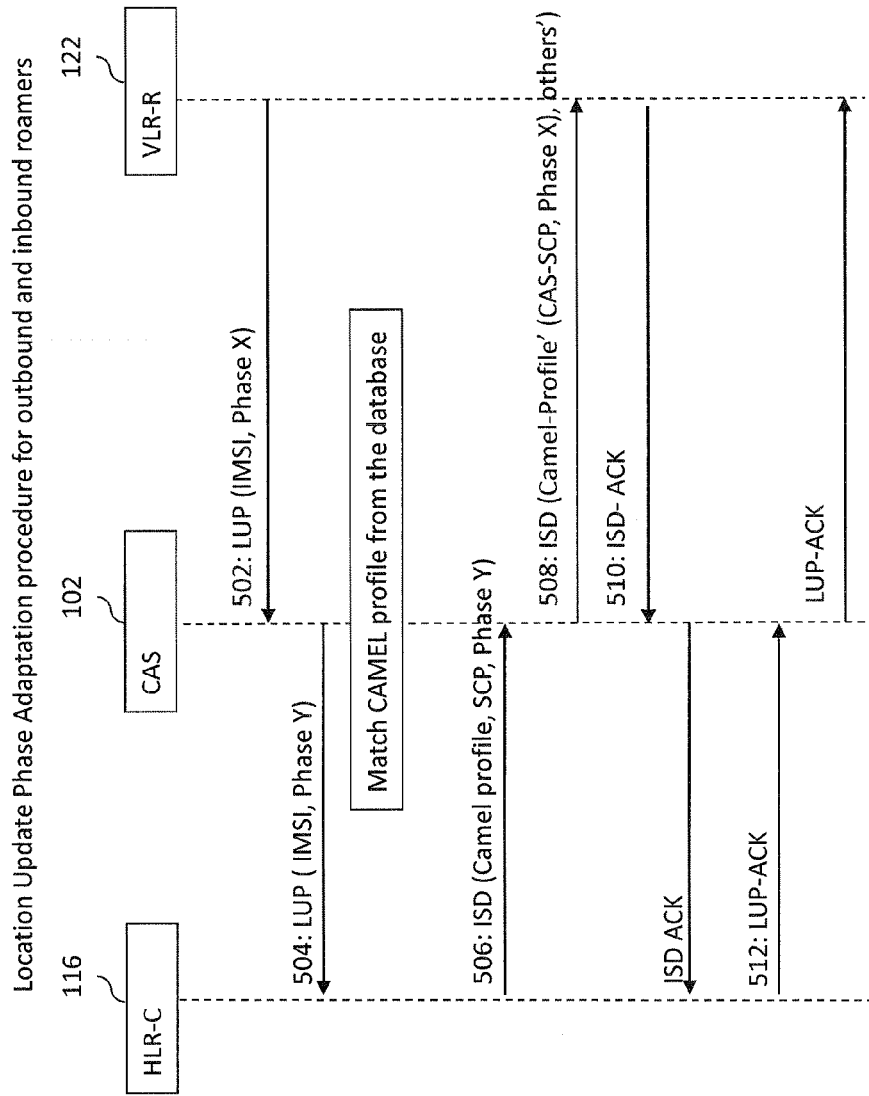
FIG. 5 represents a flow diagram for performing location update phase adaptation for the inbound and the outbound roamers of the club network, in accordance with an embodiment of the present invention.

FIG. 5 represents a flow diagram for performing location update phase adaptation for the inbound and the outbound roamers of the club network, in accordance with an embodiment of the present invention. As explained earlier, CAS 102 maintains a list of camel phases supported for both inbound and outbound by each operator i.e., each club member. Now, when a location update of an outbound roamer at a roaming partner indicates a CAMEL phase that is not supported by the club member (i.e., the HPMN), CAS 102 either downgrades or upgrades the camel phase in the MAP LUP message and in the application context in CAMEL profile from MAP ISD to match with the HPMN. As shown in FIG. 5, at step 502, VLR-R 122 sends a LUP message with CAMEL phase X, that gets interfaced/intercepted by CAS 102. Now, CAS 102 checks in its database for the stored CAMEL profile that matches with club networks 104. Hence, at step 504, CAS 102 sends the LUP message with modified CAMEL Phase Y to HLR-C 116. In response to this LUP message, HLR-C 116, at step 506, sends the ISD message with CAMEL profile on phase Y to CAS 102. Thereafter, at step 508, CAS 102 again modifies the CAMEL profile according to Phase X and sends the ISD message to VLR-R 122. So, roaming partner network 120 believes that the outbound roamer's HPMN is also CAMEL phase X compliant. Thereafter, the location update is completed successfully with the exchange of ISD-ACK and LUP-ACK messages at step 510 and 512, respectively.

Similarly for inbound roamers, when location update of the inbound roamer from a roaming partner (i.e. HPMN of the inbound roamer) indicates a camel phase that is not supported by the VPMN (i.e., club member 104), then CAS 102 either downgrades or upgrades the camel phase from MAP LUP and application context in CAMEL profile from MAP ISD.

b) Long Number Adaptation

In certain SCP (like the prepaid CAMEL 1 based), call control needs to be brought back to home network with a temporary number which might be non-routable from a VPMN's perspective. In such a situation, rather than changing the SCP, CAS 102 provides another indirection level of adaptation by mapping the long number from the HPMN's SCP into another new routable temporary number and then relay the modified message to the VPMN, so that the VPMN can route the new temporary number. When routing on the new temporary number reaches the club network, a signal interface (e.g., SIG, INAP, ISUP, CAP etc.) to CAS 102 can allow to get back the original long number.

Figure 6:
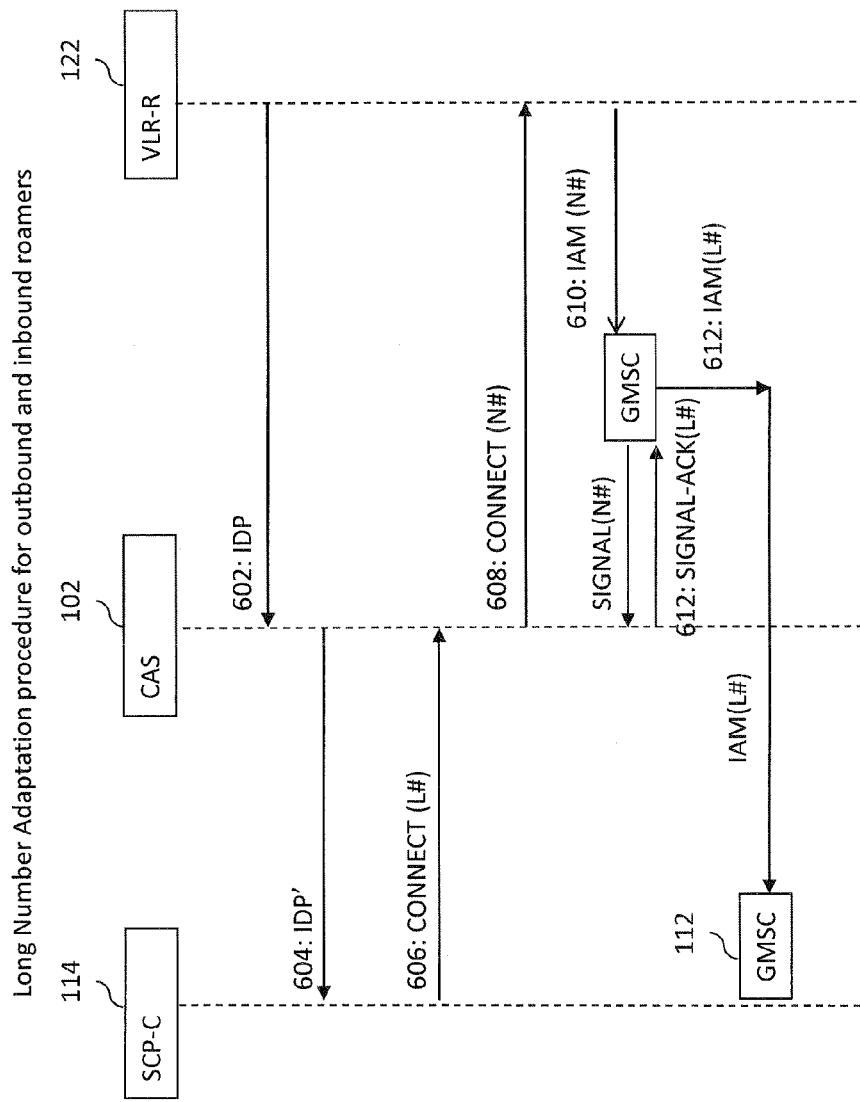
FIG. 6 represents a flow diagram for performing long number adaptation for the inbound and the outbound roamers of the club network, in accordance with an embodiment of the present invention.

FIG. 6 represents a flow diagram for performing long number adaptation for the inbound and the outbound roamers of the club network, in accordance with an embodiment of the present invention. At step 602, club member 104's outbound roamer's call activity triggers an IDP from VMSC-R 122 towards CAS 102. At step 604, CAS 102 relays the IDP to HLR-C 116. Now, when at step 606, SCP-C 116 sends back a Connect (L#) to CAS 102, CAS 102 checks the L# against its database. After observing that the L# is a long number that is not routable in roaming partner network 120 (i.e., the VPMN), CAS 102 performs a long number adaptation. In this, at step 608, CAS 102 maps the L# to another short number, say N#, and relays the modified Connect message to VLR-R 122. This short number N# is routable in the VPMN country, i.e., roaming partner network 120. Now whenever, VLR-R 122 routes the call on the shorter number N#, the call reaches back to CAS 102, as shown at step 610. Thereafter, at step 612, CAS 102 changes short number N# back to long number L# and passes the call to GMSC of club network (i.e., GMSC-C 112). In this way, SCP-C 114 is not changed, yet long number adaptation is performed.

It will be apparent to a person skilled in the art that though the above procedure is shown for the outbound roamers of club network 104, the similar procedure (call flow) can be applied for the inbound roamers visiting club network 104, in which case, club network 104 will acts as VPMN, while roaming partner network 120 will act as HPMN.

c) Phase 3 or Phase 2 Outbound Roaming Adaptation in Phase 1 Network Some SCPs only support CAMEL phase 2 or above implementation for prepaid outbound roamers. This situation becomes a problem for the roaming partner networks that only support CAMEL phase 1, where they do not support Apply Charging reporting. Instead of modifying the SCP, CAS 102 performs CAMEL phase adaptations in two alternative methods, as described in two embodiments below.

Figure 7:
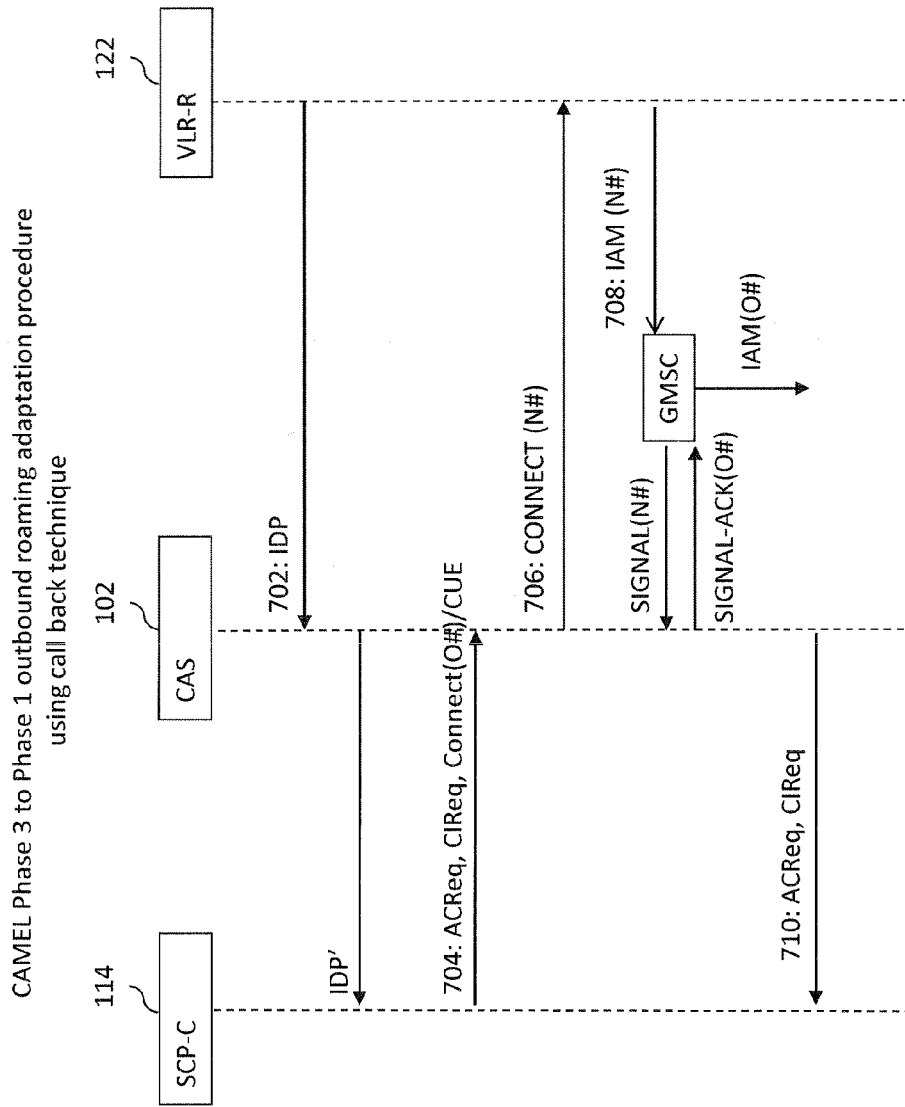
FIG. 7 represents a flow diagram for performing CAMEL phase adaptation for the outbound roamers of the club network, in accordance with a first embodiment of the present invention.

FIG. 7 represents a flow diagram for performing CAMEL phase adaptation for the outbound roamers of the club network, in accordance with a first embodiment of the present invention. In this first embodiment, the call back to CAS 102 is seamlessly routed. CAS 102 first performs the CAMEL phase adaptation during location update (as explained in FIG. 5 above) from roaming partner's (VPMN's) Phase 1 to Phase 2 or 3 of club network 104 (i.e. HPMN). For CAP operations, CAS 102 performs a relay function as a SSP/SSF to the HPMN (club network) and as an SCP/SCF to the VPMN (roaming partner). Hence, at step 702, CAS 102 relays the IDP message from VLR-R 122 to SCP-C 114 by modifying it. Since VLR-R 122 (i.e., VPMN) does not support messages like ACReq, CIReq, FCI, ACReport and CIRep, due to lower CAMEL phase, CAS 102 registers these requests and performs necessary adaptations at the end. As shown at step 704, when SCP-C 114 sends messages like ACReq, CIRReq, and Connect (O#), and Continue, CAS 102 registers them and sends a Connect (N#) message, at step 706, to VLR-R 122. This number N# is routable to CAS 102 and hence it is able to bring the MO-call from VPMN to HPMN (i.e., club network) via the modified Connect (N#) message, as shown at step 708. Thereafter, CAS 102 monitors the call status of the MO-Call to handle ACReport, CIRep back to SCP-C 114 (at step 710) and produces FCI CDR at CAS 102.

Figure 8:
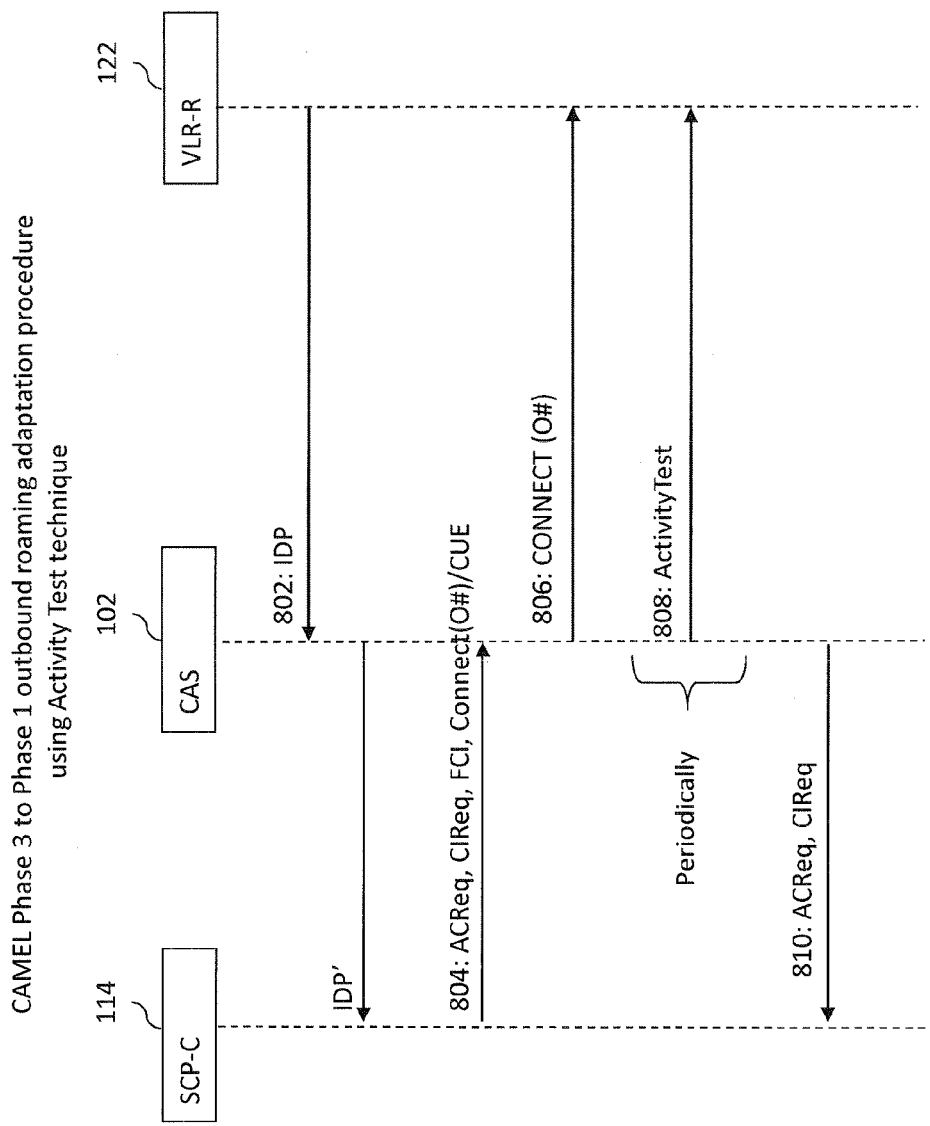
FIG. 8 represents a flow diagram for performing CAMEL phase adaptation for the outbound roamers of the club network, in accordance with a second embodiment of the present invention.

However, in the above approach all calls are routed back through CAS 102 even when they are local calls. This creates unnecessary signaling traffic. In another variant of the CAMEL phase adaptation, periodic activity test approach is used. FIG. 8 represents a flow diagram for performing CAMEL phase adaptation for the outbound roamers of the club network, in accordance with a second embodiment of the present invention. In this second embodiment too, CAS 102 first performs the CAMEL phase adaptation during location update (as explained in FIG. 5 above) from roaming partner's (VPMN's) Phase 1 to Phase 2 or 3 of club network 104 (i.e. HPMN). For CAP operations, CAS 102 performs a relay function as a SSP/SSF to the HPMN (club network) and as an SCP/SCF to the VPMN (roaming partner). Hence, at step 802, CAS 102 relays the IDP message from VLR-R 122 to SCP-C 114 by modifying it. Since VLR-R 122 (i.e., VPMN) does not support messages like ACReq, CIReq, FCI, ACReport and CIRep, due to lower CAMEL phase, CAS 102 registers these requests and performs necessary adaptations at the end. As shown at step 804, when SCP-C 114 sends messages like ACReq, CIRReq, and Connect (O#), CAS 102 registers them and relays the same Connect (O#) message, at step 806, to VLR-R 122. Thereafter, at step 808, CAS 102 periodically pings the VLR-R 122 via ActivityTest CAP message. Based on the periodical feedback CAS 102 then sends ACReport, CIRep back to SCP-C 114 (at step 810) and produces FCI CDR at CAS 102.

Figure 9:
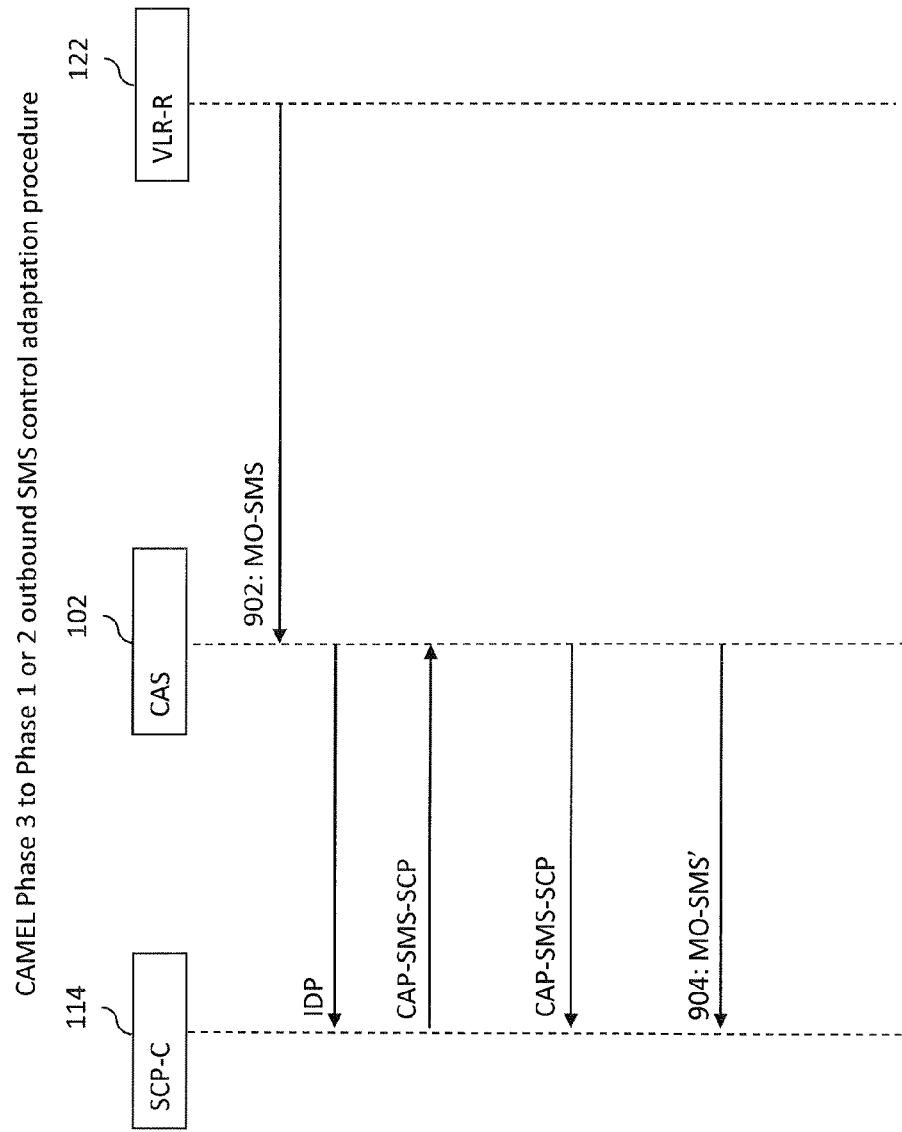
FIG. 9 represents a flow diagram for performing CAMEL phase adaptation for SMS control of the outbound and the inbound roamers of the club network, in accordance with an embodiment of the present invention.

It will be apparent to a person skilled in the art that though both the above procedures are shown for the outbound roamers of club network 104, the similar procedures (call flows) can be applied for the inbound roamers visiting club network 104, in which case, club network 104 will acts as VPMN, while roaming partner network 120 will act as HPMN.

d) CAMEL Phase 3 to Phase 1 or 2 Outbound SMS Control Adaptation Procedure Mostly, the home operators perform prepaid SMS control based on Camel Phase 3. Now, when their roamers visit the Phase 2 or 1 networks, they lose the real-time MO-SMS charging capability and have to resort to some form of hot billing. CAS 102 provides an adaptation approach by routing all MO-SMS of roamers from such operators at Non-Camel Phase-3 networks through CAS 102. FIG. 9 represents a flow diagram for performing CAMEL phase adaptation for SMS control of the outbound and the inbound roamers of the club network, in accordance with an embodiment of the present invention. CAS 102 first performs the CAMEL phase adaptation during location update (as explained in FIG. 5 above) from roaming partner's (VPMN's) Phase 1 to Phase 2 or 3 of club network 104 (i.e. HPMN). CAS 102 stores the Phase 3 CAMEL SMS profile of the roamer. All MO-SMS by the outbound roamer of club network 104 sent from VMSC-R 122 are intercepted by CAS 102 (shown at step 902). CAS 102 then acts as CAMEL Phase 3 SSF/SSP using the stored Camel 3 profile for the roamer to interface with CAP 3 SMS related messages to SCP-C 114, before relaying the modified MO-SMS to SCP-C 114 at step 904 (i.e. the final destination, HPMN SMSC).

e) Call Forwarding Adaptations

Usually, prepaid charging for outbound roaming by HPMN SCP is based on the VMSC/VLR address received in CAP IDP message from the VPMN VMSC. However, some VPMNs do not send such an address under certain conditions. For example, an operator with an Ericsson network where some GMSCs do not include a call reference number while sending the MAP Provide Roaming Number (PRN) message to the roaming partner's VLR for a MT call to an outbound roamer. The problem arises in call forwarding situation when the roamer is roaming in a Nokia network with Camel Phase 1, where the IDP message triggered from the call forwarding does not contain location address since there is no call reference number from HPMN. Hence, in camel IDP trigger on MT forwarded call, call reference number needs to come from the HPMN GMSC. This problem does not arise for Camel Phase 2 or above where the MSC address is included regardless of the existence of a valid call reference number, as it is mandatory.

Figure 10:
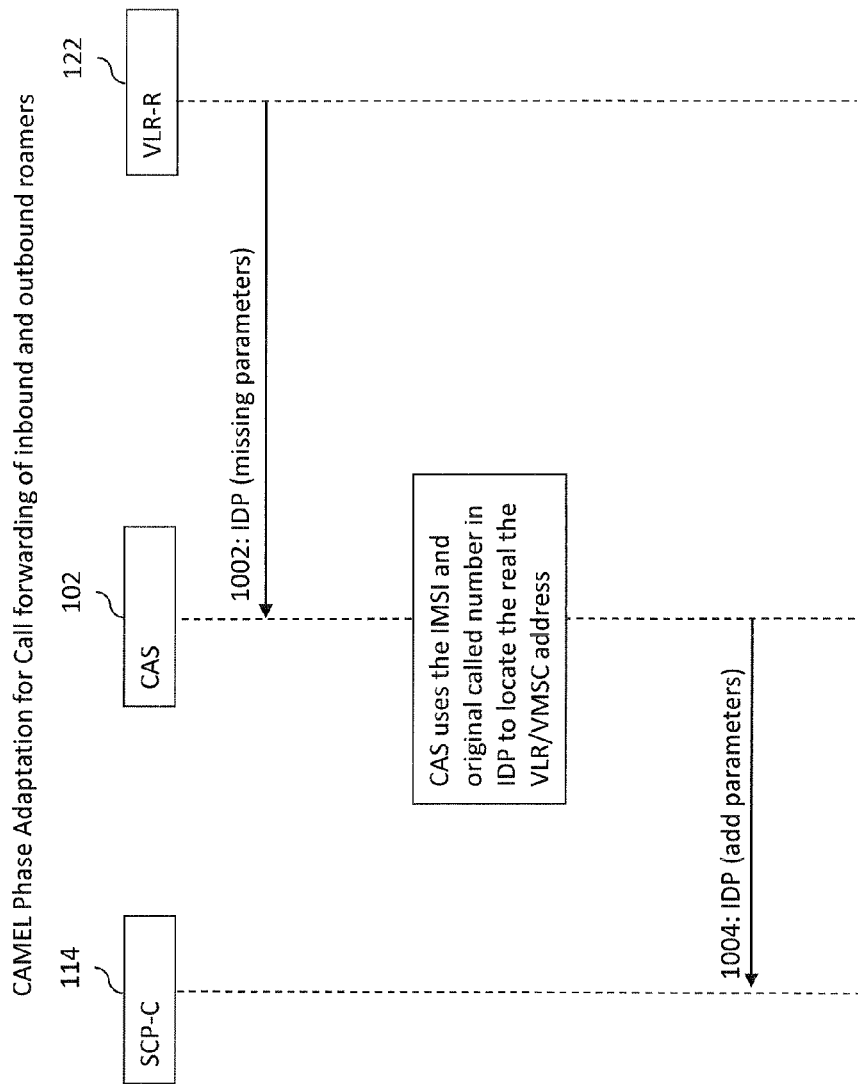
FIG. 10 represents a flow diagram for performing call forwarding CAMEL phase adaptation for the outbound and the inbound roamers of the club network, in accordance with an embodiment of the present invention.

FIG. 10 represents a flow diagram for performing call forwarding CAMEL phase adaptation for the outbound and the inbound roamers of the club network, in accordance with an embodiment of the present invention. CAS 102 contains in its database information about an operator whether call reference number is sent or not in the PRN message. When the outbound roamer of such an operator is roaming in a Camel Phase 1 network, CAS 102 checks, at step 1002, if the IDP message has a missing location address (VMSC-R/VLR-R), especially in situations where the call reference number is missing and the IDP trigger is due to call forwarding. Using the IMSI and the original called number in the IDP message, CAS can substitute the real MSC address (and an artificial call reference number) before relaying the IDP message to the HPMN SCP-C 114, at step 1004. There could be various methods to locate the VLR/VMSC address from IMSI and MSISDN, such as using MAP SRI/SRI-SM/ATI messages or through roaming probe data.

It will be apparent to a person skilled in the art that though the above procedure is shown for the outbound roamers of club network 104, the similar procedure (call flow) can be applied for the inbound roamers visiting club network 104, in which case, club network 104 will acts as VPMN, while roaming partner network 120 will act as HPMN.

Camel Billing Adaptation Procedure for Outbound and Inbound Roamers

Figure 11:
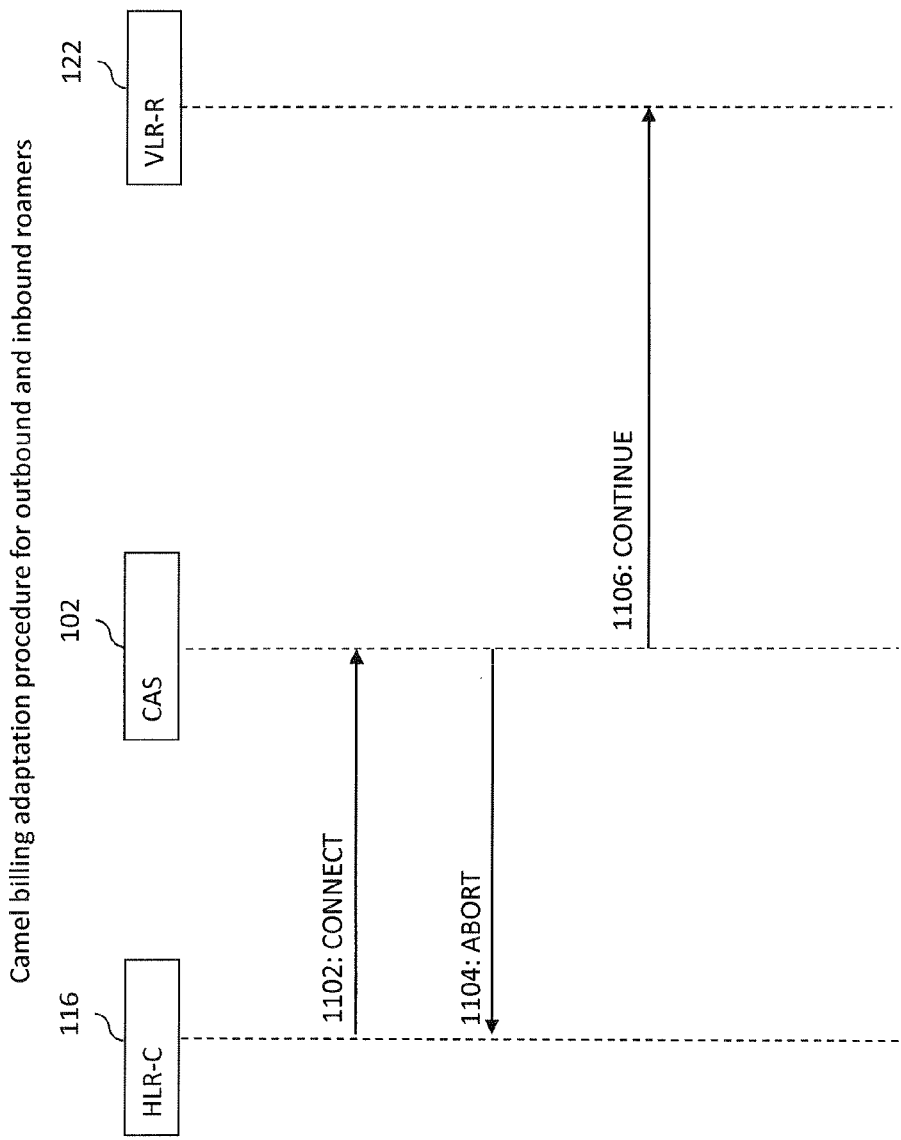
FIG. 11 represents a flow diagram for performing CAMEL billing adaptation for the outbound and the inbound roamers of the club network, in accordance with an embodiment of the present invention.

Some operators' VMSCs cannot handle connected number but only called number or dialed number. To solve this problem, CAS 102 performs CAMEL billing adaptation procedure. FIG. 11 represents a flow diagram for performing CAMEL billing adaptation for the outbound and the inbound roamers of the club network, in accordance with an embodiment of the present invention. At step 1102, CAS 102 receives the CAMEL Connect message from HLR-C 116. Now, since VMSC-C 122 does not handle connected number, CAS 102 at step 1104, either sends an Abort message back to HLR-C 116. Else, at step 1106, CAS 102 replaces the Connect message with Continue message and sends it to VLR-R/VMSC-R 122.

It will be apparent to a person skilled in the art that though the above procedure is shown for the outbound roamers of club network 104, the similar procedure (call flow) can be applied for the inbound roamers visiting club network 104, in which case, club network 104 will acts as VPMN, while roaming partner network 120 will act as HPMN.

Camel to Non-Camel Prepaid Adaptation

Figure 12:
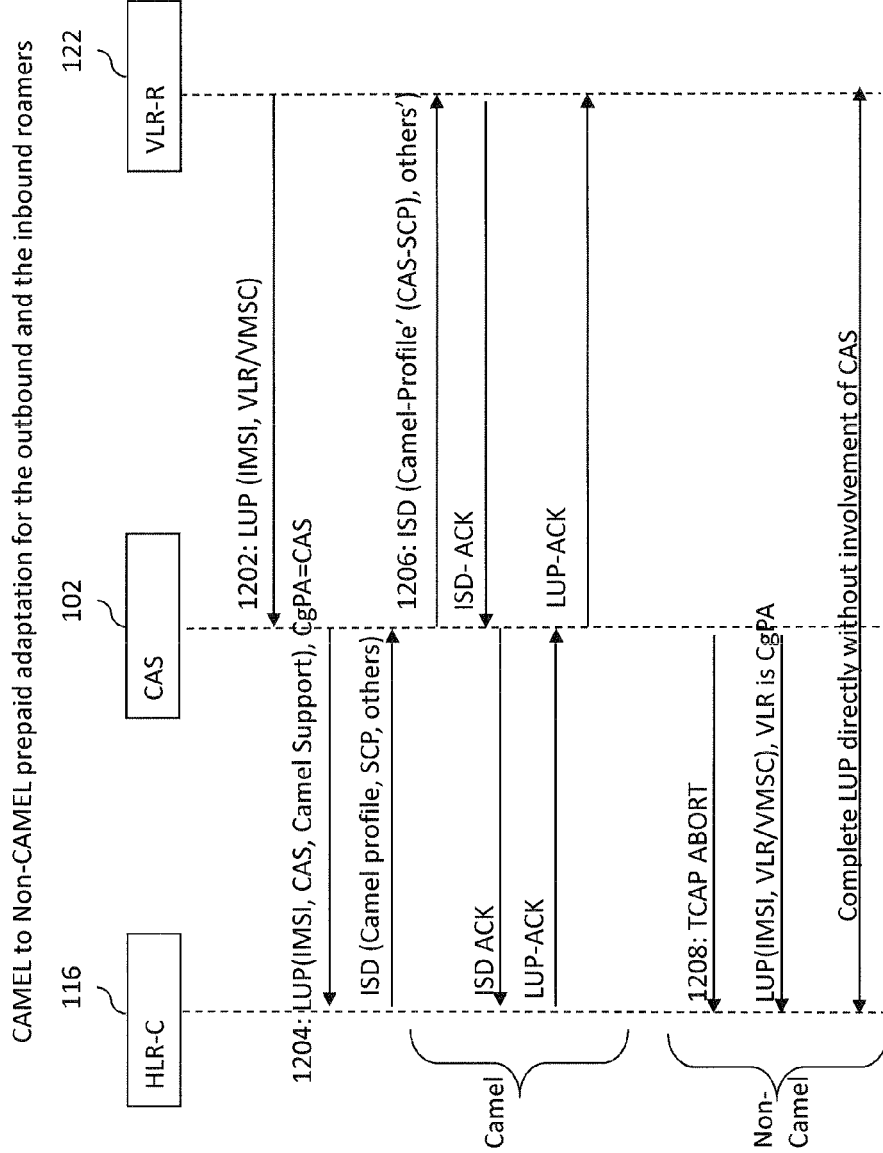
FIG. 12 represents a flow diagram for performing CAMEL to Non-CAMEL prepaid adaptation for the outbound and the inbound roamers of the club network, in accordance with an embodiment of the present invention.

Some roaming partners do not support Camel. To enable camel prepaid roaming at such networks, an HPMN can arrange to have all prepaid roamers calls relayed through CAS 102, which can perform the necessary CAMEL to non-CAMEL adaptation. FIG. 12 represents a flow diagram for performing CAMEL to Non-CAMEL prepaid adaptation for the outbound and the inbound roamers of the club network, in accordance with an embodiment of the present invention. When the outbound roamer is registering at VPMN (i.e., roaming partner network 104), it is first identified that whether the roamer is CAMEL or not. At step 1202, the location update message from VLR-R 122 is intercepted by CAS 102. At step 1204, CAS 102 modifies the Location Update message to be as if it is sent from CAS (i.e., from within HPMN). Now, if the outbound roamer is a CAMEL roamer, then HLR-C 116 sends back (via MAP ISD message) CAMEL profile to CAS 102. Hence, if the Camel profile is sent back, the roamer is a prepaid roamer. Thereafter, CAS 102 stores the Camel profile and relays the camel-less modified profile to VLR-R 122, at step 1206. This profile is marked in such a way that only call control signaling on roamers of these markers will be routed through CAS 102. Some options for such a marker are:

Subscriber MSISDN is changed to prefix-MSISDN
Subscriber category is marked to be Camel/Prepaid
Subscriber Service Key is marked to be Camel/Prepaid
Vendor specific IN profile is sent to VLR-R 122 with CAS 102 as the SCP Otherwise, if the roamer is non-camel, CAS 102 aborts the transaction with HLR-C 116 at step 1208, and resends another LUP on behalf of VLR-R 114 with real VMSC-R/VLR-R address (rather than fake CAS or HPMN address). In one embodiment of the present invention, CAS 102 waits for the second LUP from the roamer after aborting the first LUP and does this wait for three times as per the standard. Subsequently, CAS 102 is not involved (does not intercept) in the roamer's transactions.

Figure 13:
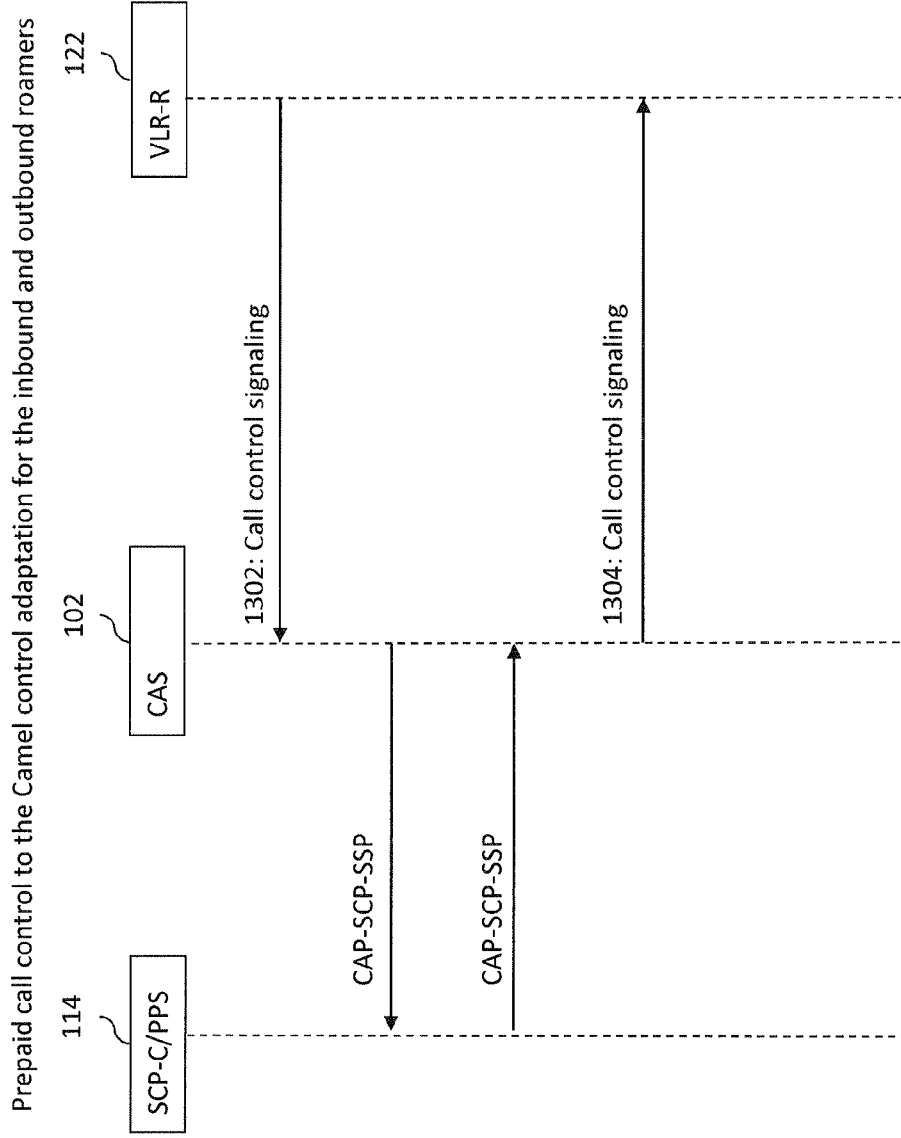
FIG. 13 represents a flow diagram for performing the prepaid call control to the Camel control adaptation for the inbound and outbound roamers of the club network, in accordance with an embodiment of the present invention.

FIG. 13 represents a flow diagram for performing the prepaid call control to the Camel control adaptation for the inbound and outbound roamers of the club network, in accordance with an embodiment of the present invention. At step 1302, the camel roamer's call control signaling comes to CAS 102. At step 1304, CAS 102 uses the stored Camel profile of the roamer to convert the call control signaling to CAP signaling and relays it to SCP-C 114, and vice-a-versa.

It will be apparent to a person skilled in the art that though both the above procedures are shown for the outbound roamers of club network 104, the similar procedures (call flows) can be applied for the inbound roamers visiting club network 104, in which case, club network 104 will acts as VPMN, while roaming partner network 120 will act as HPMN.

Figure 14:
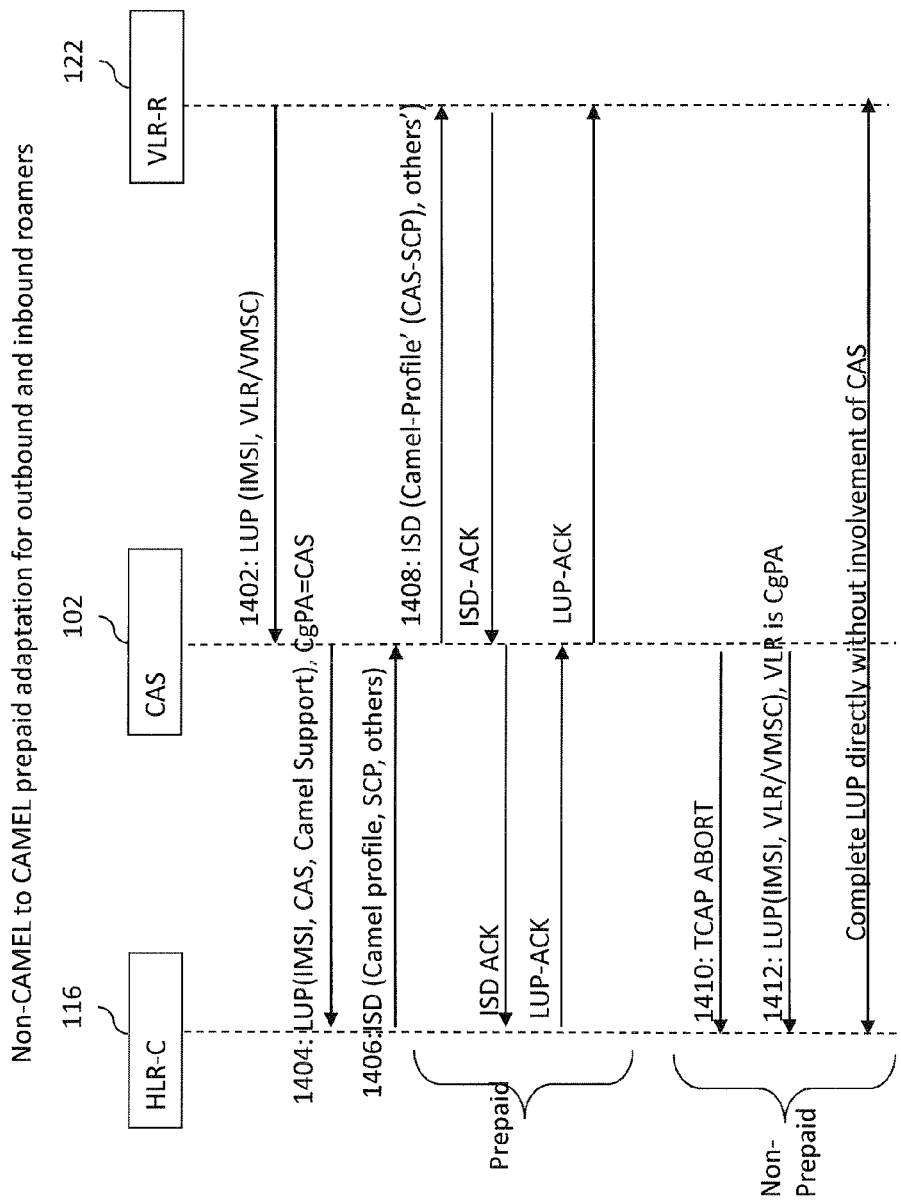
FIG. 14 represents a flow diagram for performing Non-CAMEL to CAMEL prepaid adaptation for the outbound and the inbound roamers of the club network, in accordance with an embodiment of the present invention.

Non-Camel to Camel Prepaid Adaptation Procedures for Outbound and Inbound Roamers FIG. 14 represents a flow diagram for performing Non-CAMEL to CAMEL prepaid adaptation for the outbound and the inbound roamers of the club network, in accordance with an embodiment of the present invention. Contrary to the case discussed in FIG. 12, in this embodiment, when a prepaid roamer is registering at a camel network, it is first determined by CAS 102 whether the roamer is a prepaid roamer or not. CAS 102 determines this based on HPMN IMSI, MSISDN, CAS database or when ODB for MO is allowed when roaming. At step 1402, the location update message from VLR-R 122 is intercepted by CAS 102. At step 1404, CAS 102 relays the Location Update message to be as if it is sent from CAS (i.e., from within HPMN). Now, CAS 102 examines the returned profile, at step 1406, to determine if the outbound roamer is a prepaid roamer or postpaid roamer based on above conditions. If the outbound roamer is prepaid, then at step 1408, CAS 102 modifies the profile received from HLR-C 116 to put a CAMEL profile to be relayed to VLR-R 122. However, if the outbound roamer is a postpaid roamer, CAS 102 sends, at step 1410, an ABORT message to abort the transaction. Thereafter, at step 1412, CAS 102 sends another LUP message in bypass mode (i.e. without changing the real VLR/VMSC SCCP Calling Global Title).

Figure 15:
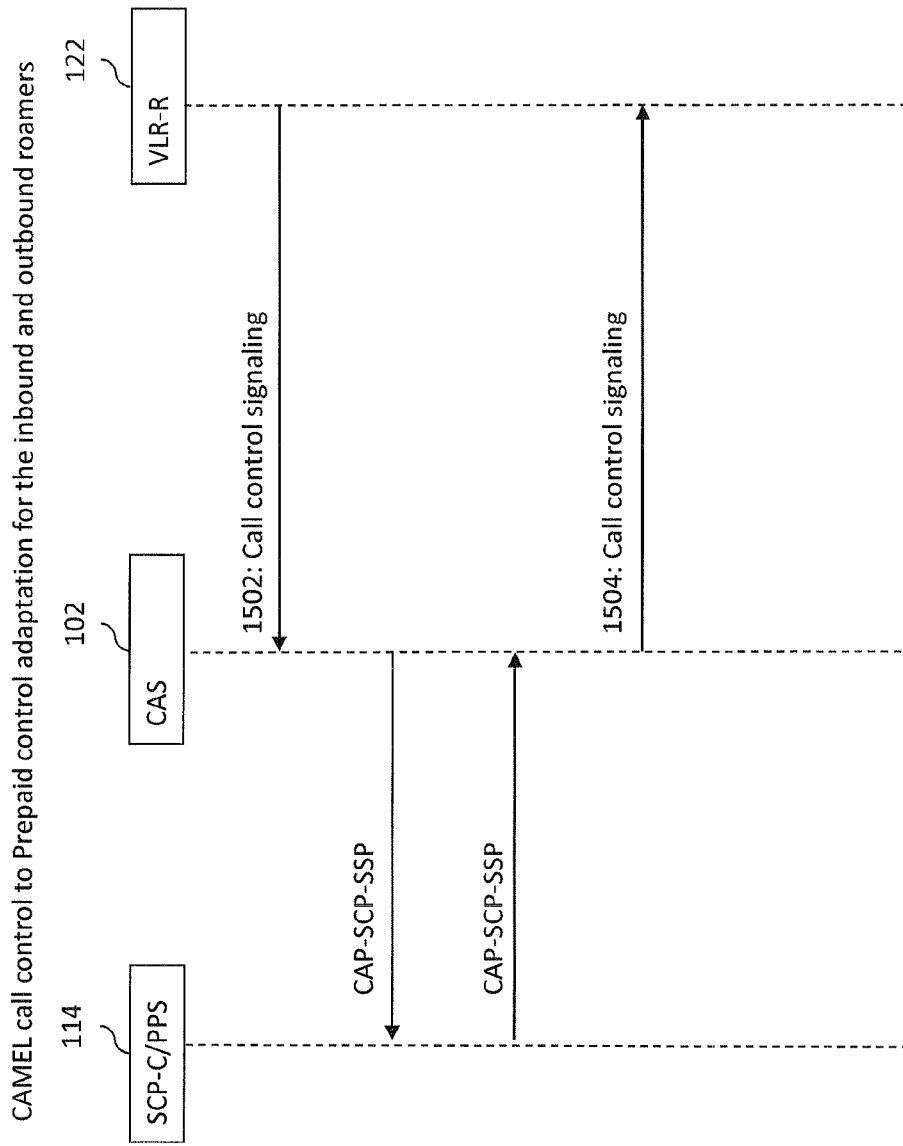
FIG. 15 represents a flow diagram for performing CAMEL call control to prepaid call control adaptations for the outbound and the inbound roamers of the club network, in accordance with an embodiment of the present invention.

FIG. 15 represents a flow diagram for performing CAMEL call control to prepaid call control adaptations for the outbound and the inbound roamers of the club network, in accordance with an embodiment of the present invention. At step 1502, prepaid roamer's camel control signaling comes to CAS 102. At step 1504, CAS 102 converts the Camel call control signaling to prepaid call control signaling and sends it HPMN PPS (PrePaid System) or SCP-C 114 (acting as PPS).

It will be apparent to a person skilled in the art that though both the above procedures are shown for the outbound roamers of club network 104, the similar procedures (call flows) can be applied for the inbound roamers visiting club network 104, in which case, club network 104 will acts as VPMN, while roaming partner network 120 will act as HPMN.

It will be apparent to a person skilled in the art, that the present invention can also be applied to Code Division Multiple Access (CDMA)/American National Standards Institute # 41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, CAS 102 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
|---|---|
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |

APPENDIX-continued

| Acronym | Description |
| --- | --- |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |

APPENDIX-continued

| Acronym | Description |
| --- | --- |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

Technical References, Each of which is Incorporated by Reference in its Entirety Herein:
GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS) (GSM 03.40 version 7.4.0 Release 1998)
GSM 378 on CAMEL Digital Cellular telecommunications system (Phase 2+); Customized Applications for Mobile network Enhanced Logic (CAMEL) Phase 2; Stage 2 (GSM 03.78 version 6.7.0 Release 1997)
GSM 978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998)
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998)
GSM 318 on CAMEL Basic Call Handling; Digital cellular telecommunications system (Phase 2+) Basic call handling; Technical realization (GSM 03.18 version 6.6.0 Release 1997)
ITU-T Recommendation Q.1214 (1995), Distributed functional plane for intelligent network CS-1
ITU-T Recommendation Q.1218 (1995), Interface Recommendation for intelligent network CS-1
ITU-T Recommendation Q.762 (1999), Signaling system No. 7—ISDN user part general functions of messages and signals
ITU-T Recommendation Q.763 (1999), Signaling system No. 7—ISDN user part formats and codes
ITU-T Recommendation Q.764 (1999), Signaling system No. 7—ISDN user part signaling procedures
ITU-T Recommendation Q.765 (1998), Signaling system No. 7—Application transport mechanism
ITU-T Recommendation Q.766 (1993), Performance objectives in the integrated services digital network application
ITU-T Recommendation Q.769.1 (1999), Signaling system No. 7—ISDN user part enhancements for the support of Number Portability

I claim:

1. A method of facilitating roaming of subscribers associated with a club network, the method comprising:
monitoring, via a gateway, traffic exchanged between the club network and a roaming partner network of the club network;
intercepting, by the gateway, one or more messages associated with a subscriber associated with one of the club network and the roaming partner network, wherein the one or more messages originate from one of the club network or the roaming partner network of the club network and have a destination network of the other of the club network or the roaming partner network of the club network, and wherein the one or more messages from the originating network follow a first supported implementation of a Customized Application for Mobile Enhanced Logic (CAMEL) protocol or a first supported phase of the CAMEL protocol;
performing, by the gateway, one or more modifications to the one or more intercepted messages, based on one or more second supported implementations of the CAMEL protocol or one or more second supported phases of the CAMEL protocol of the destination network, to ensure a protocol match of the message to the one or more second supported implementations the CAMEL protocol or a phase match of the message to one or more second supported phases of the CAMEL protocol of the destination network, the one or more modifications enabling roaming for the subscriber by changing the supported implementation of the CAMEL protocol or the supported phase of the CAMEL protocol for the one or more messages;

wherein the club network and the roaming partner network correspond to one of a Home Public Mobile Network (HPMN) and a Visited Public Mobile Network (VPMN).

2. The method claim 1, wherein the gateway is situated on a network either inside the club network or outside the club network having a signalling connection to reach the club network, thereby facilitating roaming of subscribers for one or more club networks.

3. The method of claim 2, wherein the signalling connection comprises at least one of Signalling System 7 (SS7), Session Initiated Protocol (SIP) and Integrated Services Digital Network (ISDN) User Part (ISUP).

4. The method of claim 1, wherein the subscriber is an outbound roamer of the club network, the club network being the HPMN and the roaming partner network being the VPMN.

5. The method of claim 1, wherein the modifications further comprise at least one of:
 a SCP adaptation;
 a location adaptation;
 a CAMEL phase adaptation; or
 a CAMEL billing adaptations.

6. The method of claim 1, wherein the subscriber is an inbound roamer of the club network.

7. The method of claim 6, wherein the subscriber is an inbound roamer of the club network, the club network being the VPMN and the roaming partner network being the HPMN.

8. The method of claim 1, wherein the gateway comprises of a database.

9. The method of claim 8, wherein the database comprises information that enables the gateway to perform one or more modifications.

10. The method of claim 1, further comprising:
 relaying, by the gateway, the one or more modified messages to the destination network.

11. The method of claim 1, wherein the modifications comprise modifying one or more parameters of each intercepted message.

12. A system for facilitating roaming of subscribers associated with a club network, the system comprising:
 a gateway associated with the club network for monitoring traffic exchanged between the club network and a roaming partner network of the club network by intercepting one or more messages associated with a subscriber associated with one of the club network and the roaming partner network, wherein the one or more messages originate from one of the club network or the roaming partner network of the club network and have a destination network of the other of the club network or the roaming partner network of the club network, and wherein the one or more messages from the originating network follow a first supported implementation of a Customized Application for Mobile Enhanced Logic (CAMEL) protocol or a first supported phase of the CAMEL protocol;
 wherein the gateway performs one or more modifications of the one or more intercepted messages based on one or more second supported implementations of the CAMEL protocol or one or more second supported phases of the CAMEL protocol of the destination network, to ensure a protocol match of the message to the one or more second supported implementations the CAMEL protocol or a phase match of the message to one or more second supported phases of the CAMEL protocol of the destination network, the one or more modifications enabling roaming for the subscriber by changing the supported implementation of the CAMEL protocol or the supported phase of the CAMEL protocol for the one or more messages; and wherein the club network and the roaming partner network correspond to one of a Home Public Mobile Network (HPMN) and a Visited Public Mobile Network (VPMN).

13. The system of claim 12, wherein the subscriber is an outbound roamer of the club network, the club network being the HPMN and the roaming partner network being the VPMN.

14. The system of claim 12, wherein the subscriber is an inbound roamer of the club network, the club network being the VPMN and the roaming partner network being the HPMN.

15. The system of claim 12, wherein the gateway is situated on a network either inside the club network or outside the club network having a signalling connection to reach the club network, thereby facilitating roaming of subscribers for one or more club networks.

16. The system of claim 15, wherein the signalling connection comprises at least one of Signalling System 7 (SS7), Session Initiated Protocol (SIP) and Integrated Services Digital Network (ISDN) User Part (ISUP).

17. The system of claim 12, wherein the gateway relays the one or more modified messages to the destination network.

18. The system of claim 12, wherein the modifications comprise modifying one or more parameters of each intercepted message.

19. A computer program product comprising a non-transitory computer usable medium including computer usable program code for facilitating roaming of subscribers associated with a club network, the computer program product comprising:
 computer usable program code for monitoring, via a gateway, traffic exchanged between the club network and a roaming partner network of the club network;
 computer usable program code for intercepting, by the gateway, one or more messages associated with a subscriber associated with one of the club network and the roaming partner network, wherein the one or more messages originate from one of the club network or the roaming partner network of the club network and have a destination network of the other of the club network or the roaming partner network of the club network, and wherein the one or more messages from the originating network follow a first supported implementation of a Customized Application for Mobile Enhanced Logic (CAMEL) protocol or a first supported phase of the CAMEL protocol; and
 computer usable program code for performing, by the gateway, one or more modifications of the one or more intercepted messages based on one or more second supported implementations of the CAMEL protocol or one or more second supported phases of the CAMEL protocol of the destination network, to ensure a protocol match of the message to the one or more second supported implementations the CAMEL protocol or a phase match of the message to one or more second supported phases of the CAMEL protocol of the destination network, the one or more modifications enabling roaming for the subscriber by changing the supported implementation of the CAMEL protocol or the supported phase of the CAMEL protocol for the one or more messages;

wherein the club network and the roaming partner network correspond to one of a Home Public Mobile Network (HPMN) and a Visited Public Mobile Network (VPMN).

* * * * *